United States Patent [19]

Russell

[11] 4,151,773
[45] May 1, 1979

[54] DEFECT SCRIBER

[75] Inventor: Harold C. Russell, Hickory Hills, Ill.

[73] Assignee: The United States of America as represented by the United States Department of Energy, Washington, D.C.

[21] Appl. No.: 901,045

[22] Filed: Apr. 28, 1978

[51] Int. Cl.² .............................................. B26D 3/08
[52] U.S. Cl. ...................................... 83/879; 83/180; 83/184; 83/586
[58] Field of Search ................. 83/879, 179, 180, 184, 83/187, 586, 875

[56] References Cited

U.S. PATENT DOCUMENTS

| | | | |
|---|---|---|---|
| 1,588,200 | 6/1926 | Skelton | 83/180 X |
| 1,790,515 | 1/1931 | Trumble | 83/180 X |
| 3,464,313 | 9/1969 | Shay et al. | 83/187 X |
| 3,759,140 | 9/1973 | Connelly | 83/184 X |

*Primary Examiner*—Frank T. Yost

*Attorney, Agent, or Firm*—Dean E. Carlson; Frank H. Jackson

[57] ABSTRACT

This disclosure describes a device for repeatably scribing a V-shaped scratch having sharply defined dimensions on the interior surface of a nuclear reactor fuel rod tube. A cutting tool having a V-shaped cutting tip is supported within the fuel rod tube so that the V-shaped cutting tip can be pivoted about an axis and scribe a scratch on the interior surface of the fuel rod tube. Lengthwise the scratch runs parallel to a line drawn through the axis of the fuel rod tube and is in the shape of an arc, and widthwise the scratch is V-shaped. This shape is used because the dimensions of the scratch can be plugged into appropriate formulas to calculate stress intensity of cracks in fuel rod tubes. Since the fuel rod tubes which are to be scribed may be radioactive, the scratching assembly is designed for use in a fixture which allows it to be operated in a cave by remote control handling devices.

6 Claims, 7 Drawing Figures

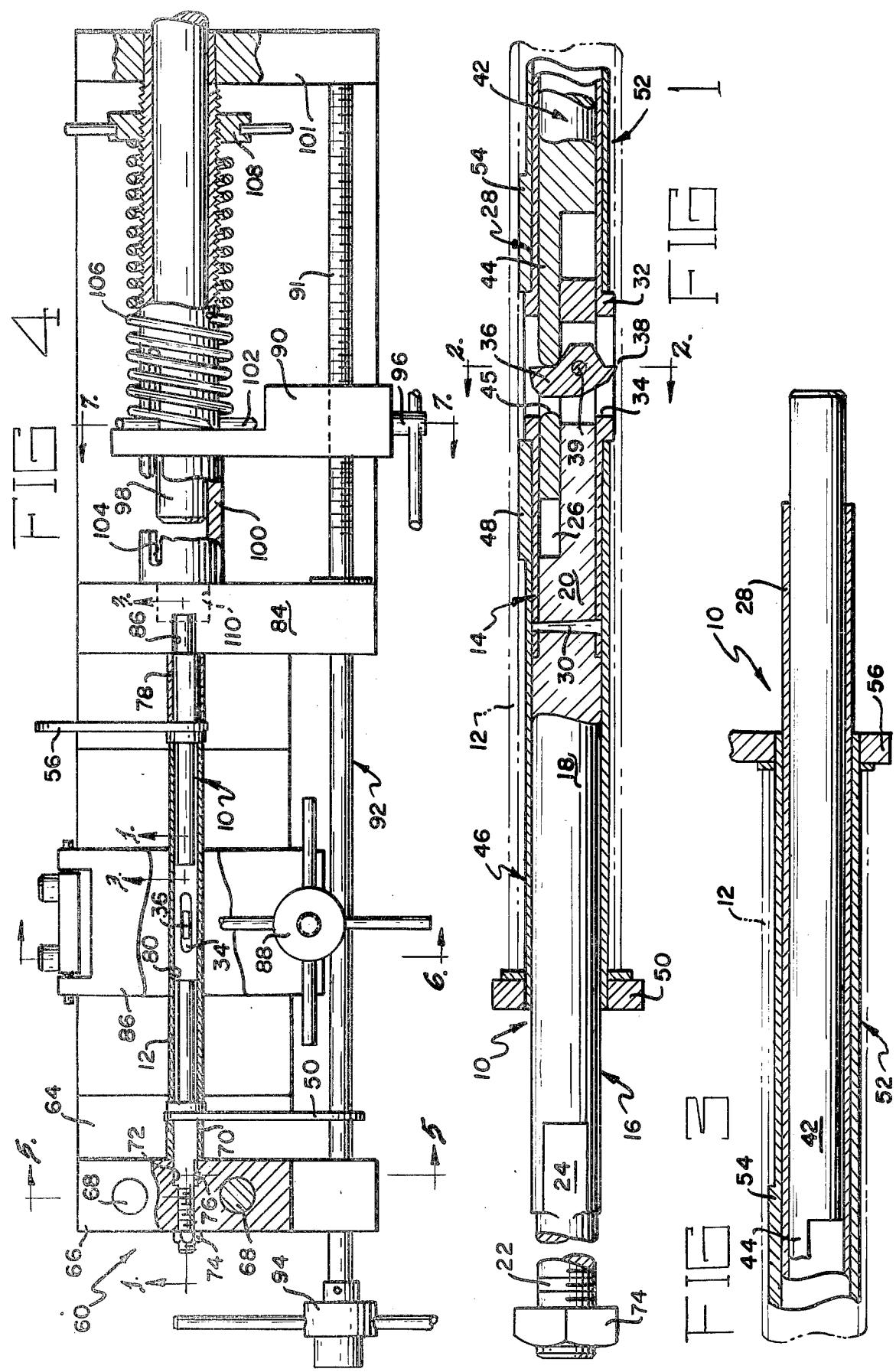

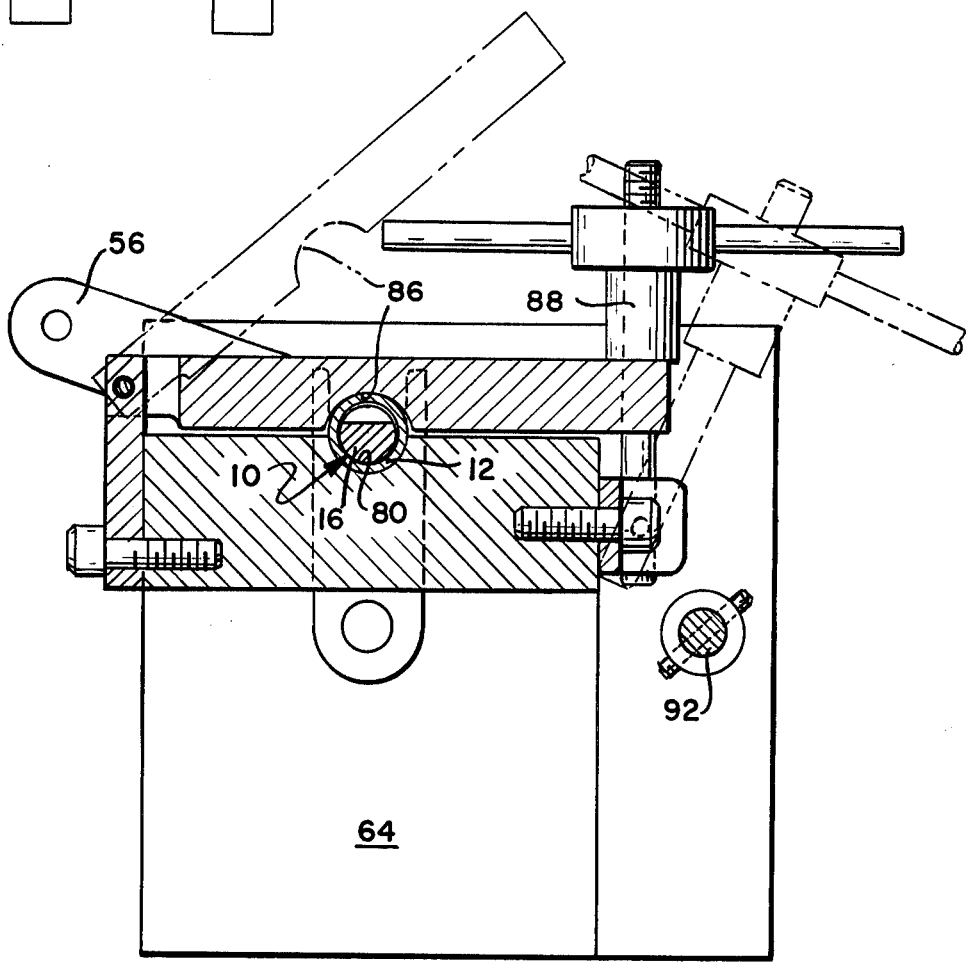
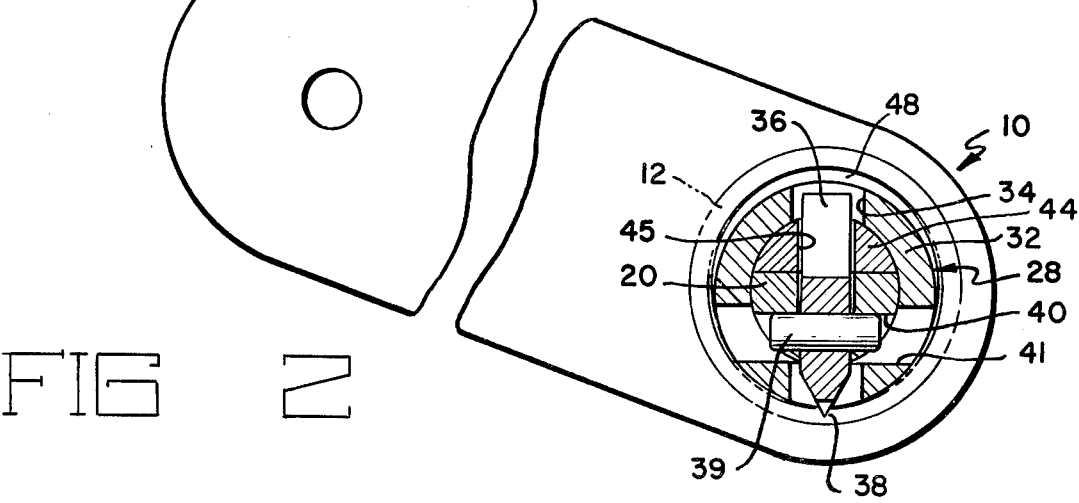

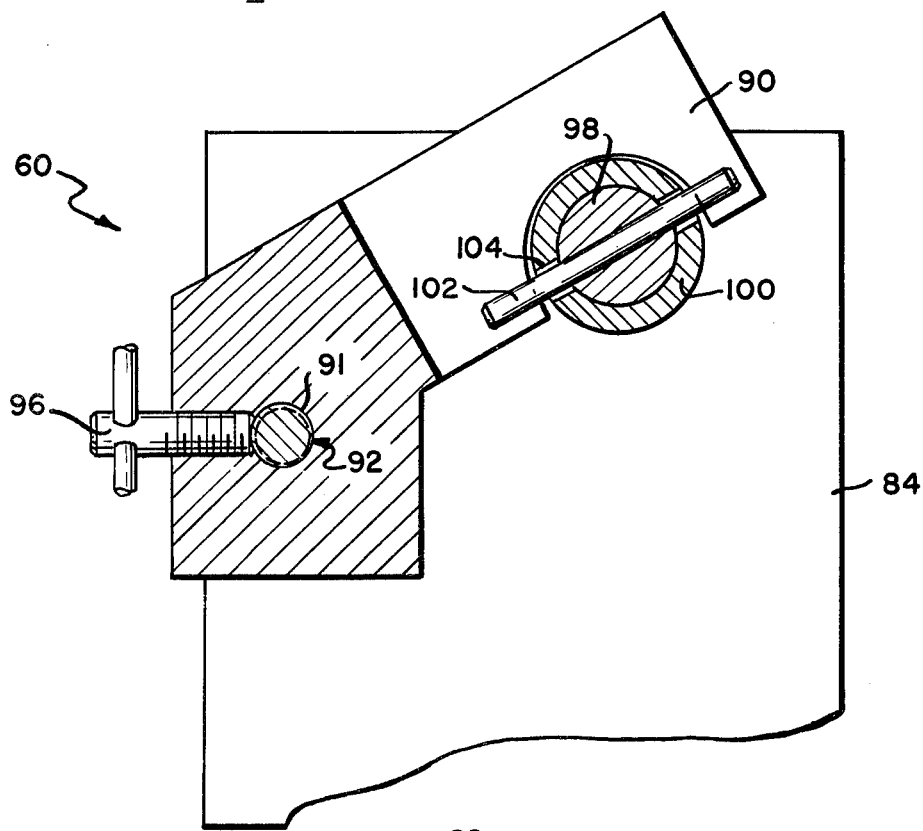
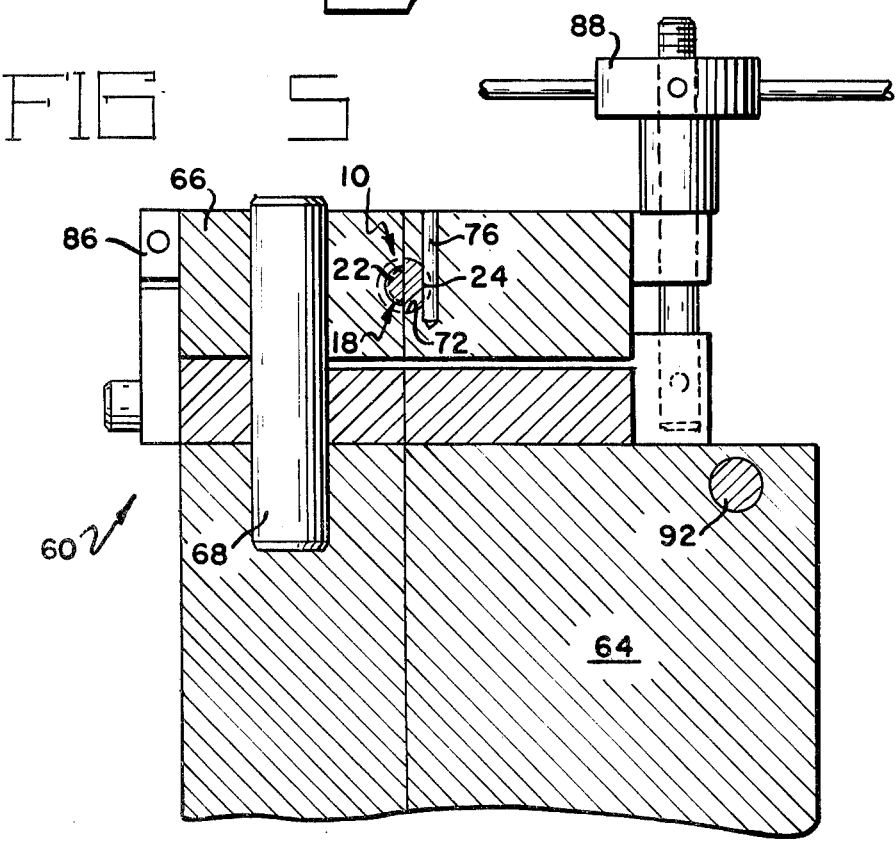

DEFECT SCRIBER

CONTRACTUAL ORIGIN OF THE INVENTION

The invention described herein was made in the course of, or under, a contract with the UNITED STATES DEPARTMENT OF ENERGY.

BACKGROUND OF THE INVENTION

This invention relates to a device for repeatably scribing a scratch having sharply defined dimensions on the interior surface of a nuclear reactor fuel rod tube. More particularly, lengthwise the scratch runs parallel to a line drawn through the axis of the fuel rod tube and is in the shape of an arc, and widthwise the scratch is V-shaped.

It is becoming increasingly important from a safety view-point to determine how long a fuel rod tube will last in reactor use (failure time) with defects such as scratches on its interior surface. There are two methods to determine failure time, by the use of destructive testing and by the use of formulas which are well known in the art. The correlation of these two methods is essential to developing a reliable, cheap and fast way of accurately predicting failure time.

Destructive testing involves intentionally scoring the interior surface of a fuel rod tube with a known defect and then subjecting the tube to a hydraulic test of about 10,000 psi at reactor temperature until failure occurs. The shape of the scratch is important so that the dimensions of the scratch can be plugged into appropriate formulas which are well known in the art to calculate stress intensity of cracks in the fuel rod tubes so that failure time can be predicted. Lengthwise the scratch must run parallel to a line drawn through the axis of the fuel rod tube and be in the shape of an arc, and widthwise the scratch must be V-shaped.

A device was necessary for scribing a scratch on the internal surface of a fuel rod tube with the above discussed shape which can repeatably scribe a scratch having sharply defined dimensions. The device must also be adaptable for use in a cave by remote control handling devices since testing must be done upon irradiated as well as nonirradiated fuel rod tubing. Several devices have been developed for scribing defects in fuel rod tubes. However, these are time-consuming, expensive, and do not repeatably scribe scratches with well defined dimensions.

It is therefore an object of the present invention to provide a device which can repeatably scribe a scratch having sharply defined dimensions on the interior surface of a fuel rod tube. Lengthwise the scratch runs parallel to a line drawn through the axis of the fuel rod tube and is in the shape of an arc, and widthwise the scratch is V-shaped.

It is a further object of the present invention to provide a device for scribing a scratch on the interior surface of a fuel rod tube in a relatively inexpensive and non-time-consuming manner.

It is a further object of the present invention to provide a device for scribing a scratch on the interior surface of a fuel rod tube which is adaptable for use in a cave by remote control handling devices.

SUMMARY OF THE INVENTION

In accordance with the invention a scratching assembly is disclosed for repeatably scribing a scratch having well defined dimensions on the interior surface of a nuclear reactor fuel rod tube. A cutting tool having a V-shaped cutting tip is supported within the fuel rod tube so that the V-shaped cutting tip can be pivoted about an axis and scribe a scratch on the interior surface of the fuel rod tube. Lengthwise the sratch runs parallel to a line drawn through the axis of the fuel rod tube and is in the shape of an arc, and widthwise the scratch is V-shaped. This shape is used because the dimensions of the scratch can be plugged into appropriate formulas to calculate stress intensity of cracks in fuel rod tubes.

The cutting tool is rotatively supported within the fuel rod tube by a tool bar assembly. An activating bar which extends beyond the interior of the fuel rod tube engages the cutting tool whereby sliding the activating bar in and out of the fuel rod tube causes the cutting tool to pivot back and forth about its axis. The tool bar assembly is rigidly braced against the interior surface of the fuel rod tube by a pair of bracing members so that as the cutting tool is pivoted about the axis by the activating bar its cutting tip will scribe a scratch on the interior surface of the fuel rod tube having the characteristics as defined above.

Finally, since the fuel rod tubes which are to be scribed may be radioactive, the scratching assembly is designed for use in a fixture which allows it to be operated in a cave by remote control handling devices.

BRIEF DESCRIPTION OF THE DRAWINGS

Other objects and advantages of the invention will become apparent upon reading the following detailed description and upon reference to the drawings in which:

FIG. 1 is a partly broken away side view of a portion of the scratching assembly;

FIG. 2 is a sectional view taken in the direction of the arrows 2—2 in FIG. 1 of the scratching assembly showing the nesting of the cutting tool;

FIG. 3 is a partly broken away side view of the scratching assembly which includes an extension to the right the portion of the scratching assembly not shown in FIG. 1;

FIG. 4 is a partially broken away plan view of a holding fixture with the scratching assembly mounted to it;

FIG. 5 is a sectional side view taken in the direction of the arrows 5—5 in FIG. 4.

FIG. 6 is a sectional side view taken in the direction of the arrows 6—6 in FIG. 4 showing how the scratching assembly is clamped to the holding fixture; and FIG. 7 is a sectional side view taken in the direction of the arrows 7—7 in FIG. 4 of the holding fixture showing how the latch engages the plunger to cock the holding fixture.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

Referring first to FIG. 1 there is shown a scratching assembly 10 which is a device for scribing a scratch on the interior surface of a fuel rod tube 12 (shown in phantom). Scratching assembly 10 comprises a tool bar assembly 14 which contains a tool bar 16 having at one end a right circular cylindrical first section 18 and a coaxial right circular cylindrical second section 20 whose diameter is less than the diameter of first section 18. First section 18 has at one end a threaded end 22 and a cut out portion 24 which will be described later. Second section 20 has a distal portion removed 26 which is bounded by a first plane parallel to a line drawn through the axis of tool bar 16 and a second plane which is perpendicular to a line drawn through the axis of tool bar 16. Tool bar assembly 14 also contains a right circular cylindrical sleeve 28 which is slidably engaged over and extends beyond second section 20 of tool bar 16 and butts against first section 18 of tool bar 16. The outer diameter of sleeve 28 is substantially equal to the outer diameter of first section 18 of tool bar 16.

Sleeve 28 and tool bar 16 are rigidly held together by a taper pin 30 which extends through both sleeve 28 and tool bar 16 and is flush with the surfaces of sleeve 28. Tool bar assembly 14 could be constructed from one piece but two pieces are used because of the difficulty of grinding one piece to the appropriate dimensions. Integrally attached about the outer surface of sleeve 28 is a right circular cylindrical center collar 32 which has a diameter which is slightly smaller than the inside diameter of fuel rod tube 12 and slightly larger than the outside diameter of sleeve 28. Center collar 32 has an axis which is eccentric to the axis of sleeve 28. The purpose of this will be explained later. Center collar 32 is positioned so that the plane formed by a line drawn through the axis of sleeve 28 and a line drawn through the axis of center collar 32 is perpendicular to the first plane which bounds the distal portion removed 26 of second section 20 of tool bar 16.

Slot 34 extends through sleeve 28 and center collar 32, extending through the distal portion of second section 20 of tool bar 16. Slot 34 is defined by two planes which are parallel and equidistant to the plane formed by a line drawn through the axis of cylindrical member 28 and a line drawn through the axis of center collar 32.

Mounted within slot 34 is cutting tool 36 which has a cutting tip 38 with a V-shaped edge which scribes a V-shaped scratch on the inner surface of fuel rod tube 12. As can best be seen in FIG. 2 the cutting tool 36 is rotatably mounted upon pin 39 which is pressure mounted within hole 40 which extends through second section 20 of tool bar 16. There is also a slightly large hole 41 in sleeve 28 which lines up with hole 40. Hole 41 in sleeve 28 allows access to pin 39 for removal of the cutting tool 36. Cutting tool 36 is mounted to rotate in a plane which is formed by a line drawn through the axis of sleeve 28 and a line drawn through the axis of center collar 32, and so that cutting tip 38 can pivot through and beyond slot 34.

The device for pivoting the cutting tool 36 is described as follows: Activating bar 42 is slidably disposed within the open end of sleeve 28. Protruding from the end of the activating bar 42 is a finger 44. The distal portion of the finger 44 fits slidably within the distal portion removed 26 of second section 20 of tool bar 16. Finger 44 also contains slot 45 which surrounds the end of cutting tool 36 opposite cutting tip 38 (see FIG. 1). By sliding activating bar 42 in and out of sleeve 28, finger 44 engages cutting tool 36 causing cutting tool 36 to pivot back and forth within and beyond slot 34.

The following elements along with center collar 32 are utilized to brace the above described elements against fuel rod tube 12. First bracing member 46 fits slidably over tool bar 16 and part of sleeve 28. First bracing member 46 has right circular cylindrical collar portion 48 eccentrically at one end, the outer surfaces of first bracing member 46 and collar portion 48 being tangent along a line. Collar portion 48 has a diameter which is slightly smaller than the inside diameter of fuel rod tube 12 and substantially equal to the diameter of center collar 32. Welded to the end of first member 46 perpendicular to a line drawn through the axis of first bracing member 46 is lever 50.

A second bracing member 52 containing collar portion 54 and lever 56 (see FIG. 3) which is substantially identical to first bracing member 46 fits slidably over the other end of sleeve 28. The purpose of these bracing members is to lock center collar 32 against fuel rod tube 12 centered at slot 34.

Scratching assembly 10 is set up for scribing a scratch on the interior surface of fuel rod tube 12 as follows: Activating bar 42 is pulled from sleeve 28 until cutting tip 38 of cutting tool 36 is pivoted completely into slot 34. Bracing member 46 is slidably engaged over tool bar 16 until its butts against center collar 32. Bracing member 46 is rotated about its axis until collar portion 48 is lined up with center collar 32. Fuel rod tube 12 which is to be scribed is slidably engaged over sleeve 28 and bracing member 46 until it butts up against lever 50. Bracing member 52 is slidably engaged over sleeve 28 and into fuel rod tube 12 until fuel rod tube 12 butts up against lever 56. Before this can be done collar portion 54 of bracing member 52 must be lined up with center collar 32.

Scratching assembly 10 along with fuel rod tube 12 can be inserted into any suitable holding fixture. However, since the above-described apparatus was intended for use with fuel rod tubes which are possibly radioactively contaminated, a holding fixture which can be operated in a cave with remote mechanical arms was designed. The description of how the above-mentioned apparatus is utilized in this holding fixture as pictured in FIGS. 4, 5, 6, and 7 is used to illustrate how the invention operates.

Referring to FIG. 4 there is shown holding fixture 60 for securing and operating scratching assembly 10. Attached to one end of base 64 is mounting block 66. For easier assembly mounting block 66, to which scratching assembly 10 is secured, is slidably mounted on doll pins 68 which protrude from base 64.

In order to secure scratching assembly 10 to mounting block 66, mounting block 66 is slidably removed from doll pins 68 and thereby disengaged from base 64. Spacer 70 is slidably engaged over tool bar 16 which is in turn inserted into hole 72 in mounting block 66. Tool bar 16 and thereby scratching assembly 10 are secured to mounting block 66 by nut 74 which engages threaded end 22 of tool bar 16. (See FIGS. 1 and 4.)

To align cutting tip 38 of cutting tool 36 (see FIG. 1) so that the exact location of the scratch on fuel rod tube 12 is predetermined, cut out portion 24 of tool bar 16 (see FIG. 1) is defined by a plane which is parallel to the plane which cutting tool 36 makes as it is pivoted about its axis and a plane which is perpendicular to a line drawn through the axis of tool bar 16. Pin 76 is secured to mounting block 66 and partially blocks hole 72 to insure that tool bar 16 can only be inserted into hole 72 in one way.

Spacer 78 is slidably engaged to activating bar 42 and scratching assembly 10 is secured to base 64. This is done by sliding mounting block 66 on doll pins 68 until it rests on base 64. As can be seen in FIG. 6 scratching assembly 10 nests in a cut out trough portion 80 of base 64. The end portion of activation bar 42 rests in a cut out portion 82 of mounting block 84 which is attached to base 64. Clamp 86 is then fastened down by holddown handle 88 to secure scratching assembly 10.

To lock center collar 32 against fuel rod tube 12 centered at slot 34 so that the cutting tool 36 can scribe the inside wall of fuel rod tube 12 (see FIG. 1), levers 50 and 56 are rotated in opposite directions and secured by springs (not shown). Holding fixture 60 is now ready to be cocked.

The following elements are used to fire scratching assembly 10. Latch 90 is rotatively mounted on a threaded portion 91 of shaft 92. Winding handle 94 is securely attached to the opposite end of shaft 92. Control lever 96 is screwed into the side of latch 90. When control lever 96 is screwed tightly into latch 90, turning winding handles 94 rotates shaft 92 and thereby latch 90. (See FIGS. 4 and 7.) When control lever 96 is partially screwed into latch 90, rotating winding handles 94 rotates shaft 92 which causes latch 90 to move along threaded portion 91 of shaft 92 back and forth in a direction parallel with a line drawn through the axis of shaft 92.

Plunger 98 is nested in retaining tube 100. Retaining tube 100 is secured between mounting block 84 and retaining wall 101. Pin 102 extends through the center of plunger 98 and through two guiding slots 104 in retaining tube 100. Spring 106 surrounds the outside of retaining tube 100 and is connected at one end to the ends of pin 102 and at the other end to adjustment nut 108. The outer surface of retaining tube 100 has threads upon which adjusting nut 108 is mounted. By turning adjusting nut 108 the tension of spring 106 can be controlled.

To cock plunger 98 control lever 96 is loosened from latch 90. Winding handle 94 is rotated, moving latch 90 along threaded portion 91 of shaft 92 to a point where it can be lowered over retaining tube 100. Control lever 96 is tightly screwed into latch 90 and latch 90 is lowered over retaining tube 100 by rotating winding handle 94. Control lever 96 is loosened from latch 90. Threaded portion 91 of shaft 92 is rotated by turning winding handle 94 to engage pin 102 and compress spring 106, thereby cocking plunger 98.

To fire plunger 98, control lever 96 is screwed tightly into latch 90 and winding handle 94 is rotated until latch 90 swings up from retaining tube 100 and pin 102, releasing plunger 98. Plunger 98 slams through hole 110 in mounting block 84 and against the end of activating rod 42. This causes activating bar 42 to slide into sleeve 28 and engage cutting tool 36 which is pivoted about its axis. As cutting tool 36 is pivoted, cutting tip 38 comes into contact and scribes a V-shape scratch on the inside surface of fuel rod tube 12.

Scratching assembly 10 can now be disassembled from holding fixture 60 and fuel rod tube 12 separated from scratching assembly 10.

There are several important points about the invention which should be noted.

The cutting tool is preferably made from hardened steel. To insure the desired degree of accuracy the cutting tip can be ground to the desired depth by a trial and error method, i.e. small increments can be ground off till the V-shaped tip protrudes a predetermined distance from the slot.

As noted above, the shape of the scratch is critical so that the dimensions of the scratch can be plugged into the appropriate formula to predict failure time. The desired shape for the scratch is as follows. Lengthwise the scratch runs parallel to a line drawn through the axis of the fuel rod tube and is in the shape of an arc, and widthwise the scratch is V-shaped. Typically the width of the scratch is 0.010", with a radius of 0.001" at the point of the V and an arc of 40°-60° for the V. Also typically lengthwise the scratch is 0.100", formed from an arc having a 0.130" radius and having a radius of 0.001" at both ends.

To insure a sharp well-defined scratch, it has been found that the force applied to the activating bar should preferably be constant, hard, and fast so that heat doesn't build up in the cutting tool or fuel rod tube which would cause a distorted cut. Holding fixture 60 as described above has been found to meet these requirements and produce excellent results.

To prevent cutting tool 36 from breaking, the travel of activating bar 42, through which finger 44 engages and rotates cutting tool 36, is purposely limited. The travel of finger 44 is limited by the end face of first section 18 and the travel of activating bar 42 is limited by the end face of second section 20 (see FIG. 1). Also, as an added precaution, the travel of plunger 98 is limited by hole 110 (see FIG. 4).

To allow the fixture of FIG. 4 to accommodate fuel rod tubes of various sizes, spacers 70 and 78 are provided. Spacers 70 and 78 are also used to prevent levers 50 and 56 from freezing against mounting blocks 66 and 84.

Thus it is apparent that there has been provided in accordance with the invention, a scratching assembly that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

The embodiments of the invention in which an exclusive property or privilege is claimed are defined as follows:

1. An assembly for scribing a scratch on the interior surface of a tube comprising:
   a cutting tool,
   means for supporting said cutting tool within said tube,
   means for bracing said support means against the interior surface of said tube, said cutting tool when braced within said tube being pivotally mounted for rotation in a plane containing the axis of said tube, the length of said cutting tool being such that when braced within the tube said cutting tool will in part of its arc contact the interior surface of said tube, and
   means for rapidly rotating said cutting tool whereby a scratch is reproducibly produced in the interior of said tube.

2. The assembly of claim 1 wherein said means for supporting said cutting tool comprises:
   a tool bar assembly having an axis and a slot which extends through said tool bar assembly, said cutting tool being rotatively supported within the slot of said tool bar assembly.

3. The assembly of claim 2 wherein said tool bar assembly comprises:

a tool bar having an axis and having at one end a right circular cylindrical first section and a coaxial right circular cylindrical second section at the other end whose diameter is less than the diameter of said first section, said second section having a distal portion removed bounded by a first plane parallel to the axis of said tool bar and a second plane perpendicular to the axis of said tool bar, a right circular cylindrical sleeve having an axis and being slidably engaged over and extending beyond the second section of said tool bar and butting against the first section of said tool bar, the outer diameter of said sleeve being equal to the outer diameter of the first section of said tool bar, means for securing said tool bar rigidly to said sleeve, wherein the slot which extends through said tool bar assembly extends through said sleeve and through the second section of said tool bar, the slot being defined by two planes which are parallel and equidistant to the plane in which said cutting tool rotates.

4. The assembly of claim 3 wherein said means for rapidly rotating said cutting tool comprises:

an activating bar slidably disposed within the open end of said sleeve, and a finger protruding from the end of said activating bar which is inserted into said sleeve, said finger having a slot, the distal end of said finger fitting slidably within the distal portion removed of the second section of said tool bar, the end of said cutting tool opposite the cutting tip of said cutting tool protruding through the slot of said finger, whereby sliding the activating bar in and out of said sleeve engages said finger with said cutting tool causing said cutting tool to pivot back and forth about its axis.

5. The assembly of claim 4 wherein said bracing means comprises:

a right circular cylindrical center collar integrally attached about the outer surface of said sleeve and extending laterally beyond both sides of the slot which extends through said sleeve, said center collar having a diameter which is slightly smaller than the inside diameter of said tube and slightly larger than the outside diameter of said sleeve, said center collar having an axis eccentric to the axis of said sleeve, the plane formed by the axis of said sleeve and the axis of said center collar being coplanar with the plane in which said cutting tool rotates, said center collar having a slot which extends to the surface of said center collar the slot located in said sleeve and the second section of said tool bar, a first tubular bracing member having an axis and fitting slidably over said tool bar and the connecting end of said sleeve, said first tubular bracing member having a right circular cylindrical collar portion eccentrically at one end, the outer surfaces of said first bracing member and the collar portion of said first bracing member being tangent along a line, the collar portion of said first bracing member having a diameter slightly smaller than the inside diameter of said fuel rod tube and substantially equal to the diameter of said center collar, a second tubular bracing member which is substantially identical to said first bracing member, said second bracing member having an axis and fitting slidably over the other end of said sleeve, and rotation means for rotating said first bracing member and said second bracing member about their axis in opposite directions until the collar portion of said first bracing member and the collar portion of said second bracing member lock said center collar against said tube centered at the slot which extends through said center collar.

6. The assembly of claim 5 wherein said means for rapidly rotating said cutting tool further comprises means for rapidly sliding said activating bar into said sleeve causing said activating bar to come in contact with and rotate said cutting tool whereby a scratch is scribed in the interior surface of said tube.

* * * * *